United States Patent [19]
Svensson et al.

[11] 3,960,453
[45] June 1, 1976

[54] ELECTRONIC TELESCOPIC SIGHT

[75] Inventors: Sven Torsten Arnold Svensson; Sven William Bjelvert, both of Eskilstuna, Sweden

[73] Assignee: Förenade Fabriksverken, Eskilstuna, Sweden

[22] Filed: Dec. 16, 1974

[21] Appl. No.: 533,132

[30] Foreign Application Priority Data
Dec. 20, 1973 Sweden .............................. 7317195

[52] U.S. Cl. ................................ 356/252; 33/241; 33/298
[51] Int. Cl.² ........................................ G02B 23/10
[58] Field of Search ..................... 33/231, 246, 298; 356/27, 252

[56] References Cited
UNITED STATES PATENTS
3,059,338  10/1962  Coeytauf ......................... 356/27 X FOREIGN PATENTS OR APPLICATIONS
331,243  12/1970  Sweden

*Primary Examiner*—John K. Corbin
*Assistant Examiner*—Matthew W. Koren
*Attorney, Agent, or Firm*—Flynn & Frishauf

[57] ABSTRACT

A telescopic sight utilizing a row of luminescence diodes defining a light point, and means for adjusting the speed of travel of the light point as a function of the speed of movement of a target. Means is further provided for extinguishing the traveling light point and for lighting a luminescence diode corresponding to the correct lead and correct superelevation when the distance to a target is set.

10 Claims, 3 Drawing Figures

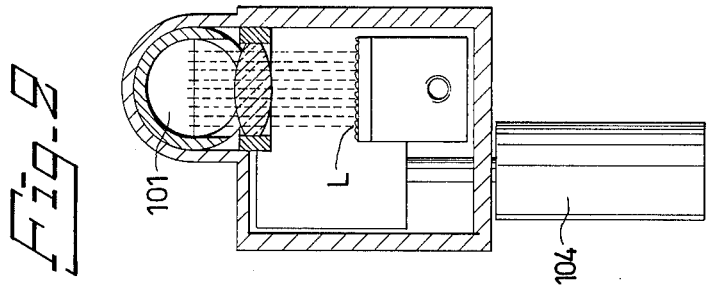
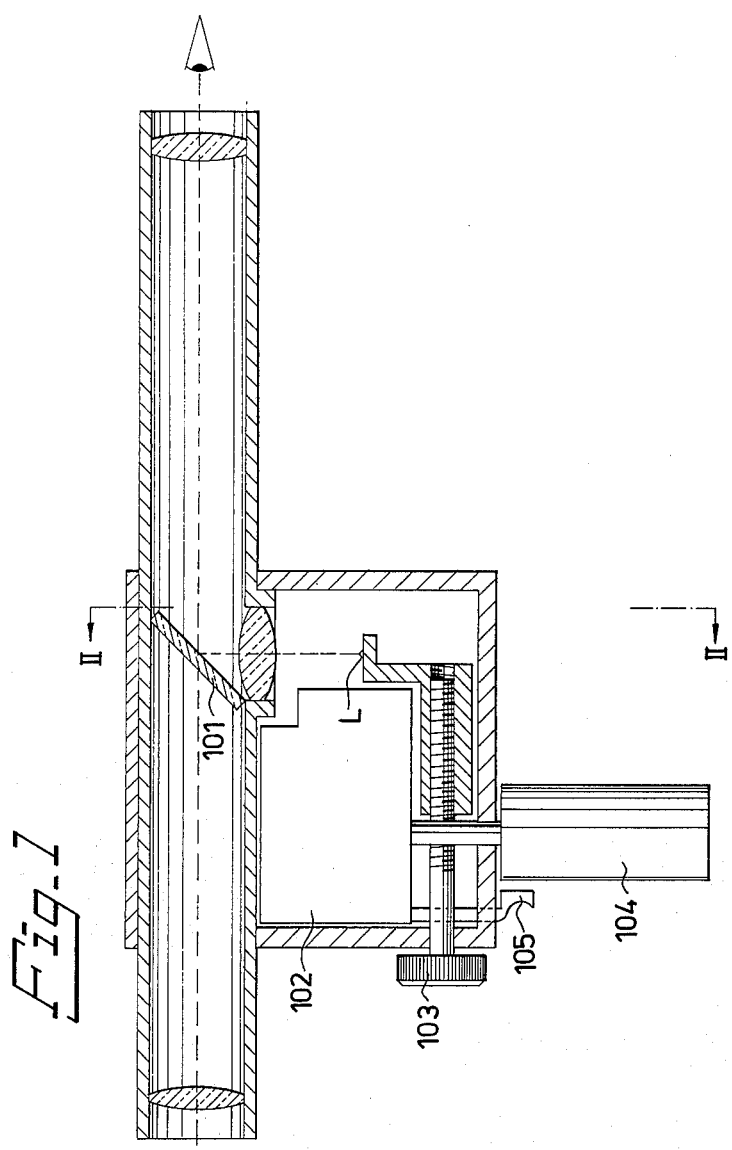

3,960,453

ELECTRONIC TELESCOPIC SIGHT

The present invention relates to sights and more particularly to an electronic telescopic sight.

BACKGROUND OF THE INVENTION

A previously known sight is based on the principle that one or more light points in a telescopic sight are made to move at the same pace as a target. The speed of the light points can be altered by means of a wheel, and are made to agree with the angular speed of the target. When this criteria is met, and with knowledge of the distance to the target, the lead and superelevation can be calculated. When the angular speed wheel and the distance wheel are turned, the aiming point is mechanically activated. The moving light points in the known sight are accomplished by a lighted motor driven screw. Triangular luminuous teeth are formed on a trace plate by the thread openings of the screw.

The present invention relates to a sight where the presentation of the moving points and the lead point or aiming point take place electronically.

SUMMARY OF THE INVENTION

The sight according to the invention is characterized by a telescope included in the sight being provided with at least one horizontal row of luminescence diodes which are so connected to electronic circuits that a moving light point is obtained, the speed of travel of said light point being manually adjustable so that the light point is caused to follow a target. The sight includes means for extinguishing the moving light point and lighting a luminescence diode giving the lead point when the distance to the target is set.

The sight telescope contains in a special embodiment one horizontal row of luminescence diodes, the sight also containing means which, when the distance to the target is set, lights the luminescence diode corresponding to the aiming point, i.e., lights the luminescence diode at the correct lead and correct superelevation.

BRIEF DESCRIPTION OF THE DRAWING

One embodiment of the sight according to the invention will be described here while referring to the attached drawings, in which FIG. 1 is an axial section through the sight telescope, FIG. 2 shows a section along to line II—II in FIG. 1.

DETAILED DESCRIPTION OF ILLUSTRATED EMBODIMENT

Figure 3:
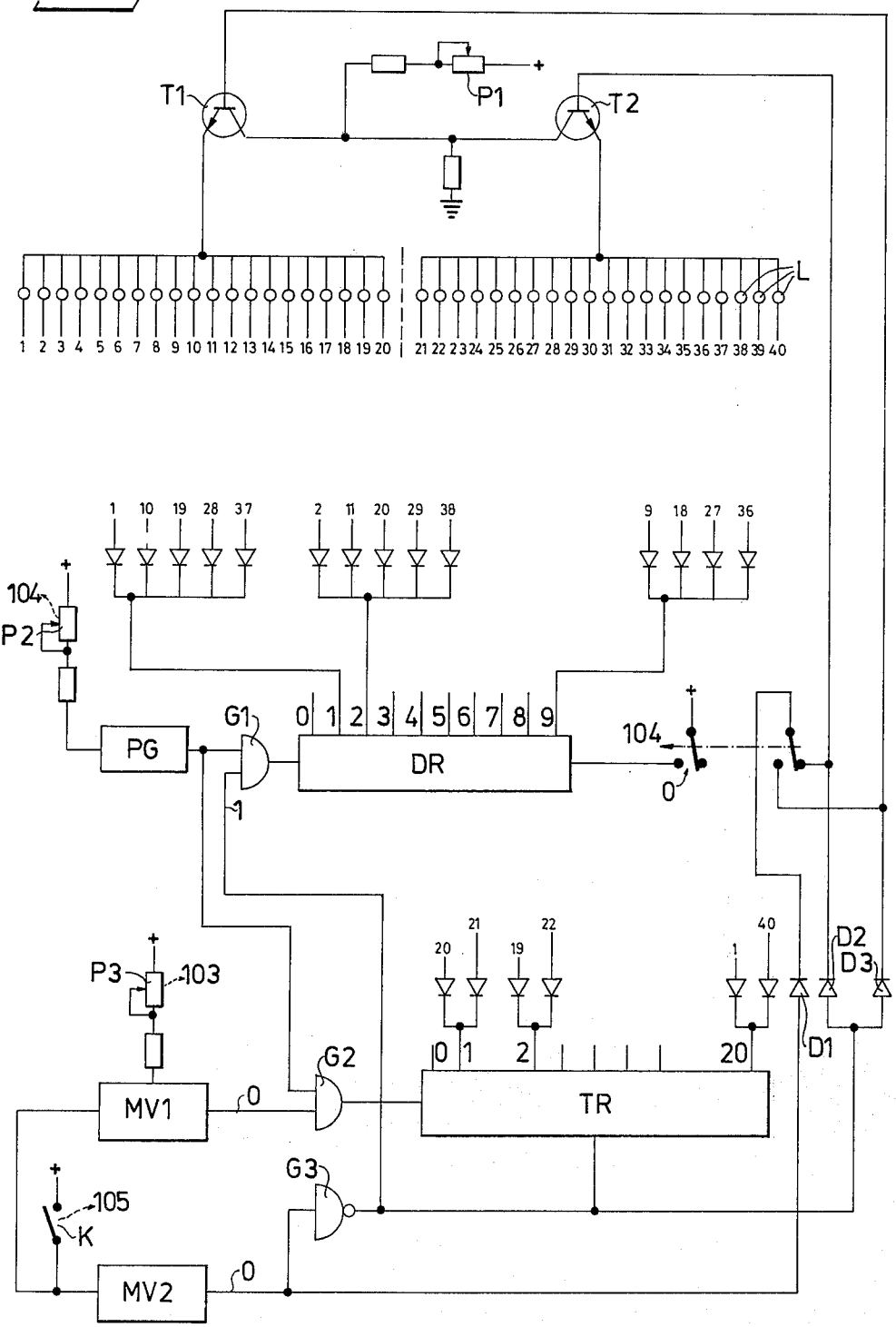
FIG. 3 is a block diagram of the electronic circuits of the sight and the luminescence diodes.

FIGS. 1 and 2 illustrate one embodiment of the sight according to the invention. The sight comprises a device 102 containing the electronic circuits (FIG. 3), a line screen 101, an operating wheel 103, a row L of diodes, a handle 104 and a button 105.

When measuring the range or distance to a target the measuring lines of line screen 101 are made to be displaced in relation to each other by means of operating wheel 103 until they delimit the measuring section. The horizontal row L of luminescence diodes, which is mirrored in line screen 101, is simultaneously moved vertically so that the correct superelevation is attained. At this moment only the center diode of row L is lighted.

When measuring the lead, electronic device 102 of the sight is operated by means of handle 104 so that only the center diode is lighted when handle 104 is in the neutral position. When handle 104 is turned to the left or to the right a train of light points is attained, which seems to move to the left or to the right, respectively. The more the handle 104 is turned the faster does the train of light points move. The measurement is performed by bringing the train of light points to move with the same angular speed as the speed of the target. When a satisfactory correspondence has been attained button 105 is pressed in. The train of light points is extinguished and if the range is previously correctly set the electronic circuits (FIG. 3) determine which diode is to be lighted and to be the aiming point.

The row of luminescence diodes L fills the whole or the greater part of the field of view of the sight. The device 102 containing the electronic circuits includes, as shown in FIG. 3, a pulse generator PG, a decade counter DR, a 20-counter TR, three gates G1, G2 and G3, two monostable flip-flops MV1 and MV2, three potentiometers P1, P2 and P3, two transistors T1 and T2, a switch O, contact means K and a number of diodes.

When the battery (or power source) of the sight is switched on, the pulse generator PG starts and steps forward the decade counter DR since the gate G1 is at high level (1) on the second input thereof. The flip-flops MV1 and MV2 are at low level (0).

The 20-counter TR is zeroed, i.e., its outputs are high. The gate G3 supplies high level via the diodes D2 and D3 to the transistors T1 and T2. The row of luminescence diodes L is thereby provided with driving voltage.

The light intensity can be adjusted by the potentiometer P1. When the pulses from the pulse generator PG reach the decade counter DR, output 1 will at first be at low level, thus lighting diodes 1, 10, 19, 28 and 37. After a further pulse, output 2 will be at low level, thus lighting the diodes 2, 11, 20, 29 and 38, and so on.

By turning the potentiometer P2 which is operatively coupled to the handle 104 the pulse repetition frequency of the pulse generator PG can be altered and thereby the travel speed of the light points can be altered. By means of the switch O, also operatively coupled to the handle 104, the target travel direction (from left or right) is determined, and the light points are caused to move in the same direction. When the pulses and the target travel with the same relative speed, the distance is then set. The range finding wheel 103 is coupled to the potentiometer P3, which affects the pulse length of the flip-flops MV1. The pulse length increase with increased distance. If a laser range finder is used, this will give an output pulse which is proportional to the distance.

When the range is measured, the contact means K is depressed by means of operating button 105, the flip-flops MV1 and MV2 are triggered and the gate G1 is set to its blocked condition. The decade counter DR is zeroed whereby all the luminescence diodes are extinguished, the gate G2 opens and pulses from the pulse generator PG are gated to be counted in the 20-counter TR. The pulses from pulse generator PG are counted in 20-counter TR at a rate which is a function of the setting of handle 104 and consequently of potentiometer P2. When the flip-flop MV1 returns to 0, the gate G2 closes and the number of pulses which are counted in 20-counter TR cause the corresponding output of 20-counter TR to assume low level. A luminescence diode L is thereby lit, either to the right or to the left of the center line of the luminescence diode row, depending on the position of the switch 0. It should be noted that the flip-flop MV2 and the gate G3 trip out the voltage to the diodes D2 and D3. This single luminescence diode is illuminated as long as the flip-flop MV2 is at high level. The pulse duration of the flip-flop MV2 corresponds to the time the measured speed and distance may be expected to apply. The flip-flop MV2 thereafter cuts out, zeroes the 20-counter TR, measures the voltage on both the left hand side and right hand side of the luminescence diode and opens the gate G1. The light points begin once again to travel with a set angular speed. This automatic trip prevents the operator from using old shooting values which would result in the target not being hit.

The above described circuit is an example of a method of providing the lead. To obtain the right superelevation the height position of the luminescence diode row in the sight must be proportional to the distance to the target. As described above this can be accomplished by making the luminescence diode row movable in height in the field of view, its position being actuated by the range finding setting, or the luminescence diode row can also be fixed while the position in height of the target is moved via a mirror or a prism. As has already been mentioned, the telescopic sight can alternatively contain a plurality of horizontal rows of luminescence diodes and the sight contain means which when the range to the target is adjusted lights the luminescence diode corresponding to the aiming point, i.e., corresponding to the correct lead and the correct superelevation.

We claim:

1. A sight comprising a telescope having:
   at least one horizontal row of luminescence diodes;
   means coupled to said diodes for successively lighting the diodes for generating a travelling light point in the field of view of the telescope;
   means coupled to said generating means for manually adjusting the travelling speed of said light point so as to cause said light point to follow a target;
   means for manually setting the distance to the target;
   means coupled to said diodes for manually extinguishing the travelling light point when it has been caused to follow the target and when the distance is set; and
   means for lighting one of said diodes in response to the adjusted travelling speed of the light point and to said setting of the distance, said lit diode corresponding to correct lead and correct superelevation so as to serve as an aiming point.

2. A sight according to claim 1, comprising one horizontal row of luminescence diodes; and wherein said means for lighting one of said diodes is coupled to said distance setting means for lighting the diode corresponding to the correct superelevation.

3. A sight according to claim 1, comprising means for adjusting the height position of the image of the luminescence diodes in the field of view as a function of the distance to the target.

4. A sight according to claim 1 wherein said means for generating a moving light point includes a pulse generator (PG), a first counter (DR) coupled to said pulse generator, and means coupling selective outputs of said first counter to predetermined luminescence diodes of said at least one row to light successive luminescense diodes to generate said moving light point.

5. A sight according to claim 4 comprising diode means coupling said outputs of said first counter to said luminescence diodes.

6. A sight according to claim 4 including means (104,P2) coupled to said pulse generator (PG) for varying the pulse repetition rate thereof to cause said moving light point to move at substantially the same speed as a moving target.

7. A sight according to claim 4 wherein said means for extinguishing the travelling light point and for lighting a luminescence diode corresponding to the correct lead and correct superelevation comprises a second counter (TR), operating means (K,105,G2,G3) coupling said second counter (TR) to said pulse generator (PG) and for zeroing said first counter (DR), and first timing means (MV1) coupled to said second counter (TR) and responsive to said operating means to enable said second counter (TR) to count pulses from said pulse generator (PG) for a given period of time and to light a given luminescence diode corresponding to the final count of said second counter (TR).

8. A sight according to claim 7 comprising means (P3) coupled to said means for setting the distance (103) and coupled to said first timing means (MV1) for causing said second counter (TR) to count said pulses for a period of time which is a function of the range of the target as determined by said range adjusting means.

9. A sight according to claim 7 further comprising second timing means (MV2,G3) for extinguishing said predetermined luminescence diode and for coupling the outputs of said pulse generator (PG) to said first counter (DR) to generate said moving light point a predetermined time period after said given luminescence diode is lit by said second counter (TR).

10. A sight according to claim 4 wherein said means for generating a moving light point further comprises switching means coupled to said luminescence diodes for reversing the direction of said moving light point.

\* \* \* \* \*